(12) United States Patent
Wu

(10) Patent No.: US 11,301,237 B2
(45) Date of Patent: Apr. 12, 2022

(54) UPGRADING METHOD AND APPARATUS

(71) Applicant: Wangsu Science & Technology Co., Ltd., Shanghai (CN)

(72) Inventor: Wenqiang Wu, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 16/987,305

(22) Filed: Aug. 6, 2020

(65) Prior Publication Data

US 2020/0379748 A1 Dec. 3, 2020

Related U.S. Application Data

(63) Continuation of application No. PCT/CN2019/096172, filed on Jul. 16, 2019.

(30) Foreign Application Priority Data

May 27, 2019 (CN) .......................... 201910444436.2

(51) Int. Cl.
*G06F 8/65* (2018.01)
(52) U.S. Cl.
CPC ...................... *G06F 8/65* (2013.01)
(58) Field of Classification Search
USPC ....................................................... 717/170
See application file for complete search history.

(56) References Cited

U.S. PATENT DOCUMENTS 7,376,945 B1 * 5/2008 Kakumani ............ G06F 9/4416
717/171
7,539,686 B2 * 5/2009 Shepard .................... G06F 8/65
(Continued)

FOREIGN PATENT DOCUMENTS

CN 101533356 A 9/2009
CN 102006332 A 4/2011
(Continued)

OTHER PUBLICATIONS

Corsin Decurtins; "Software Dependencies and Keeping Them Up-To-Date"; Netcetera.com Website [full url in ref.]; 2017 (Year: 2017).*

(Continued)

*Primary Examiner* — Qing Chen
*Assistant Examiner* — Clint Thatcher
(74) *Attorney, Agent, or Firm* — USCH Law, PC

(57) ABSTRACT

Some embodiments of the present disclosure provide an upgrading method and apparatus. The upgrading method includes, acquiring upgrading information of each component to be upgraded; determining an upgrading strategy of the each component to be upgraded according to the upgrading information of the each component to be upgraded; upgrading the each component according to the upgrading strategy of the each component to be upgraded. Using the upgrading method, different upgrading strategies for different components to be upgraded can be determined. Compared with the existing technology that requires manual determination of upgrading strategies, the upgrading method and apparatus reduce loss caused by an error from manual deployment of an application and improve application upgrading efficiency.

15 Claims, 5 Drawing Sheets

(56) References Cited

U.S. PATENT DOCUMENTS

| | | | |
|---|---|---|---|
| 8,782,632 B1 | 7/2014 | Chigurapati et al. | |
| 2002/0129352 A1* | 9/2002 | Brodersen | G06F 8/658 |
| | | | 717/174 |
| 2013/0007709 A1* | 1/2013 | Fan | G06F 8/71 |
| | | | 717/121 |
| 2015/0120722 A1* | 4/2015 | Mart N Mart Nez | |
| | | | G06F 16/9535 |
| | | | 707/733 |
| 2015/0199194 A1* | 7/2015 | Niwa | G06F 8/658 |
| | | | 717/170 |
| 2017/0371650 A1 | 12/2017 | Li et al. | |
| 2018/0060061 A1 | 3/2018 | Savagaonkar et al. | |

FOREIGN PATENT DOCUMENTS

| | | |
|---|---|---|
| CN | 104394016 A | 3/2015 |
| CN | 108345462 A | 7/2018 |
| CN | 109245915 A | 1/2019 |
| CN | 109710285 A | 5/2019 |

OTHER PUBLICATIONS

International Search Report, PCT/CN2019/096172, dated May 27, 2019, 4 pgs.

Wangsu Science & Technology Co., Office Action, CN 201910444436.2, dated May 6, 2020, 12 pgs.

Wangsu Science & Technology Co., Ltd., Extended European Search Report, EP19909617.3, dated Sep. 6, 2021, 10 pgs.

\* cited by examiner

Upgrading of application XX

First component to be upgraded

[            ]

Upgrading version number
☐ V1.0  ☐ V1.2  ☐ V1.5

Upgrading server
☐ First server   ☐ Second server
☐ Third server   ☐ Fourth server Second component to be upgraded

[            ]

Upgrading version number
☐ V1.0  ☐ V1.2  ☐ V1.5

Upgrading server
☐ First server   ☐ Second server
☐ Third server   ☐ Fourth server

FIG. 2

UPGRADING METHOD AND APPARATUS

CROSS REFERENCE TO RELATED APPLICATIONS

The application is a continuation of PCT application No. PCT/CN2019/096172, filed on Jul. 16, 2019, and entitled "UPGRADING METHOD AND APPARATUS," the disclosure of which is incorporated by reference herein in its entirety. The PCT application claims the benefit of priority to Chinese patent application No. 201910444436.2, filed on May 27, 2019, and entitled "UPGRADING METHOD AND APPARATUS." Each of the above-referenced applications is incorporated by reference herein in its entirety.

TECHNICAL FIELD

The present disclosure relates to the field of communications technology, especially to an upgrading method and apparatus.

BACKGROUND

The development of an application is a continuous process. In this process, multiple versions of application installation packages are usually produced. Application upgrading refers to upgrading of an application from a lower version to a higher version. The high version would fix some system errors in the lower version. Thus, after being upgraded, the application would generally have better performance than the lower version, have a more optimized effect, and would provide better user experience.

In the existing technology, a process of manually-controlled upgrading is usually used, and upgrading of one application can be divided into upgrading of multiple functional components. Thus, progress and deployment results have to be confirmed multiple times in a manually-controlled method, making it easy to lead to error in an upgrading process, thereby affecting upgrading efficiency.

SUMMARY

Some embodiments of the present disclosure provide an upgrading method and apparatus that solve the aforementioned problems.

According to some embodiments, an upgrading method comprises:

acquiring upgrading information of each component to be upgraded;

determining an upgrading strategy of the each component to be upgraded according to the upgrading information of the each component to be upgraded; and upgrading according to the upgrading strategy of the each component to be upgraded.

In embodiments of the present disclosure, after the upgrading information of the each component to be upgraded is acquired, an upgrading strategy of the each component to be upgraded is determined according to the upgrading information of the each component to be upgraded, and the each component to be upgraded is upgraded according to the upgrading strategy. Through the method, determination on different upgrading strategies of different components to be upgraded can be realized, which, compared with the existing technology that needs manual determination on an upgrading strategy, reduces a loss caused by an error of manual deployment of an application and improves upgrading efficiency thereof.

In embodiments of the present disclosure, determining the upgrading strategy of the each component to be upgraded according to the upgrading information of the each component to be upgraded includes, determining, if it is determined that upgrading of a second component to be upgraded is in a dependent relationship with upgrading of a first component to be upgraded, that an upgrading strategy of the second component to be upgraded is to be upgraded jointly with the first component to be upgraded.

In embodiments of the present disclosure, in order to improve the upgrading efficiency, components to be upgraded that are in a dependent relationship may be upgraded in a serial manner. It is unnecessary to manually arrange an upgrading relationship between the components to be upgraded that are in the dependent relationship, thereby the upgrading efficiency is improved in its entirety.

In embodiments of the present disclosure, the upgrading according to the upgrading strategy of the each component to be upgraded includes, acquiring an upgrading result of the first component to be upgraded after the first component to be upgraded is upgraded; and upgrading the second component to be upgraded according to the upgrading result of the first component to be upgraded and upgrading information of the second component to be upgraded.

In embodiments of the present disclosure, an upgrading process of the second component to be upgraded may be determined based on the upgrading result of the first component to be upgraded and the upgrading information of the second component to be upgraded. A selection of the upgrading process may be intelligently performed according to the upgrading results, thereby the upgrading efficiency is improved.

In embodiments of the present disclosure, determining the upgrading strategy of the each component to be upgraded according to the upgrading information of the each component to be upgraded includes, parallel upgrading, if it is determined that there is no dependent relationship between a third component to be upgraded and another component to be upgraded according to upgrading information of the third component to be upgraded and that an upgrading granularity of the third component to be upgraded is the same as an upgrading granularity of a component collection to be upgraded composed by components to be upgraded that involve a dependent relationship, the third component to be upgraded and the component collection to be upgraded.

In embodiments of the present disclosure, in order to improve the upgrading efficiency, although the third component to be upgraded is not in a dependent relationship with another component to be upgraded, the upgrading granularity of the third component to be upgraded is the same as the upgrading granularity of the component collection to be upgraded composed by components to be upgraded that involve a dependent relationship. Therefore, the third component to be upgraded can be upgraded while upgrading the component collection to be upgraded.

In embodiments of the present disclosure, the upgrading information of the each component to be upgraded includes upgrading batches; and upgrading according to the upgrading strategy of the each component to be upgraded includes, determining an upgrading batch of each server corresponding to the component to be upgraded; and upgrading each server corresponding to the component to be upgraded in turn of the upgrading batches.

In embodiments of the present disclosure, each component to be upgraded includes a plurality of upgrading batches. The upgrading is performed according to the upgrading batches to realize orderly upgrading.

In embodiments of the present disclosure, the upgrading strategy further includes, a traffic switching time and/or a traffic mounting time between servers corresponding to the components to be upgraded; and upgrading each server corresponding to the components to be upgraded in turn of the upgrading batches includes, upgrading the each server corresponding to the components to be upgraded in turn of the upgrading batches, and performing traffic switching and/or traffic mounting on each server according to the traffic switching time and/or the traffic mounting time between servers corresponding to the components to be upgraded.

In embodiments of the present disclosure, the traffic switching and traffic mounting time between the servers corresponding to the component to be upgraded may be determined flexibly, which can ensure not affecting normal operation of the component to be upgraded during the upgrading and ensure accuracy of an upgrading result.

In embodiments of the present disclosure, upgrading each server corresponding to the components to be upgraded in turn of the upgrading batches includes, verifying an upgrading result of each server corresponding to a current batch if component to be upgraded before upgrading each server corresponding to a next batch of component to be upgraded; and upgrading, each server corresponding to the next batch of component to be upgraded, if it is determined that the upgrading result of the each server corresponding to the current batch of component to be upgraded is validated.

In embodiments of the present disclosure, after upgrading of servers of each batch, upgrading results shall be verified to ensure correctness of the upgrading results.

In embodiments of the present disclosure, after upgrading according to the upgrading strategy of the each component to be upgraded, further including, saving the upgrading strategy of the each component to be upgraded, and performing re-upgrading according to the upgrading strategy when determining to perform a rollback operation.

In embodiments of the present disclosure, upgrading strategies of components to be upgraded corresponding to the same application are saved so as to perform a rollback restoration when an error occurs to the application.

In embodiments of the present disclosure, the method further includes, determining, an upgrading order of servers, by a deployment computer room and a deployment environment corresponding to the component to be upgraded; and the deployment environment is that the server is used to perform a test or is to be launched to be used after the test is completed.

In embodiments of the present disclosure, the upgrading information of the each component to be upgraded includes component identification information and component version information; and the method further includes, determining how to upgrade the components to be upgraded by acquiring the upgrading information of the each component to be upgraded.

In embodiments of the present disclosure, determining the upgrading strategy of the each component to be upgraded according to the upgrading information of the each component to be upgraded includes, determining, if it is determined that upgrading of a second component to be upgraded is no dependent relationship with upgrading of a first component to be upgraded, that an upgrading strategy of the first component to be upgraded is upgraded separately with the second component to be upgraded.

Embodiments of the present disclosure further provides an upgrading apparatus including, an acquiring unit, configured to acquire upgrading information of each component to be upgraded;

an upgrading strategy determining unit, configured to determine an upgrading strategy of the each component to be upgraded according to the upgrading information of the each component to be upgraded; and an upgrading unit, configured to perform upgrading according to the upgrading strategy of the each component to be upgraded.

For example, the upgrading strategy determining unit is specifically configured to, determine, if it is determined that upgrading of a second component to be upgraded is in a dependent relationship with upgrading of a first component to be upgraded, that an upgrading strategy of the second component to be upgraded is to be upgraded jointly with the first component to be upgraded.

In embodiments of the present disclosure, the upgrading unit is specifically configured to, acquire an upgrading result of the first component to be upgraded after the first component to be upgraded is upgraded; and upgrade the second component to be upgraded according to the upgrading result of the first component to be upgraded and upgrading information of the second component to be upgraded.

In embodiments of the present disclosure, the upgrading strategy determining unit is specifically configured to, parallel upgrade, if it is determined that there is no dependent relationship between a third component to be upgraded and another component to be upgraded according to upgrading information of the third component to be upgraded and that an upgrading granularity of the third component to be upgraded is the same as an upgrading granularity of a component collection to be upgraded composed by components to be upgraded that involve a dependent relationship, the third component to be upgraded and the component collection to be upgraded.

In embodiments of the present disclosure, the upgrading information of the each component to be upgraded includes upgrading batches; and the upgrading unit is specifically configured to, determine an upgrading batch of each server corresponding to the component to be upgraded; and upgrade the each server corresponding to the components to be upgraded in turn of the upgrading batches.

In embodiments of the present disclosure, the upgrading strategy further includes, a traffic switching time and/or a traffic mounting time between servers corresponding to the component to be upgraded; and the upgrading unit is specifically configured to, upgrade the each server corresponding to the component to be upgraded in turn of the upgrading batches, and perform traffic switching and/or traffic mounting on each server according to the traffic switching time and/or the traffic mounting time between servers corresponding to the components to be upgraded.

In embodiments of the present disclosure, the upgrading unit is specifically configured to, verify an upgrading result of the each server corresponding to a current batch of component to be upgraded before upgrading the each server corresponding to a next batch of component to be upgraded; and upgrade the each server corresponding to the next batch of component to be upgraded, if it is determined that the upgrading result of the each server corresponding to the current batch of component to be upgraded is validated.

In embodiments of the present disclosure, the apparatus further includes, a rollback unit, configured to save upgrading strategies of components to be upgraded that correspond to the same application in the each component to be upgraded, and to re-upgrade according to the upgrading strategy when it is determined that the application needs to perform a rollback operation.

Embodiments of the present disclosure further provides an electronic device including, at least one processor; and a memory in communications connection with the at least one processor;

where the memory saves instructions executable by the at least one processor, the instructions being executed by the at least one processor so that the at least one processor may implement any one of the method in the above-described embodiments.

Embodiments of the present disclosure further provides a computer-readable medium saving a computer program executable by a terminal device, so that the terminal device implements the method in any one of the embodiments when the program runs on the terminal device.

BRIEF DESCRIPTION OF THE DRAWINGS

In order to illustrate more clearly technical solutions in embodiments of the present disclosure, drawings to be used in the following embodiments will be briefly described as follows. It is evident that the drawings in the following description are only some embodiments of the present disclosure. For those skilled in the art, other drawings may be obtained based on these drawings without any inventive effort.

FIG. 2 is a schematic user interface provided in embodiments of the present disclosure.

DETAILED DESCRIPTION

In order to clarify the objective, the technical solutions and advantages of the present disclosure, the present disclosure is described in detail with reference to the drawings. It is evident that the embodiments described herein are only some rather than all embodiments of the present disclosure. Based on the embodiments of the present disclosure, all other embodiments obtained by those skilled in the art in a case that no inventive effort is made fall into the scope that the present disclosure claims to protect.

Technical terms such as "first", "second", "third", "fourth" (if applicable) in the specification, the claims and the drawings are intended to distinguish from similar objects rather than to describe a specific sequence or order. It shall be appreciated that the data so used may be interchanged where appropriate, in order to be implemented in an order other than that of the embodiments described herein. In addition, the terms "comprise" and "have" and any variants thereof are intended to cover a non-exclusive inclusion, for example, a process, method, system, product, or device that includes a series of steps or units is not necessarily limited to clearly listing steps or units thereof but may include other steps or units not explicitly listed or inherent to the process, method, product or device.

It shall be noted that in embodiments of the present disclosure, such terms as "exemplarily" or "for example" are used for presenting an example or for description. No embodiment or design described with "exemplary" or "for example" in embodiments of the present disclosure shall be understood as preferable to or more advantageous than other embodiments or designs. Precisely speaking, such terms as "exemplary" or "for example" used herein are intended to show concepts specifically.

When upgrading an application software, the application software usually includes multiple components. It may be understood that one application software is composed of multiple components. Implementation of the application software is supported by functions of the multiple components. Therefore, upgrading to the application software is to upgrade multiple components of the application software. Each component may correspond to multiple servers, that is, for one component, multiple servers may be used to implement the component. Therefore, to upgrade the application software is to upgrade the servers of each component.

Exemplarily, the application software is a chat social software that includes such components as for chatting, financial management and games. Upgrading the chat social software is to upgrade servers of the components for chatting, financial management and games.

Figure 1:
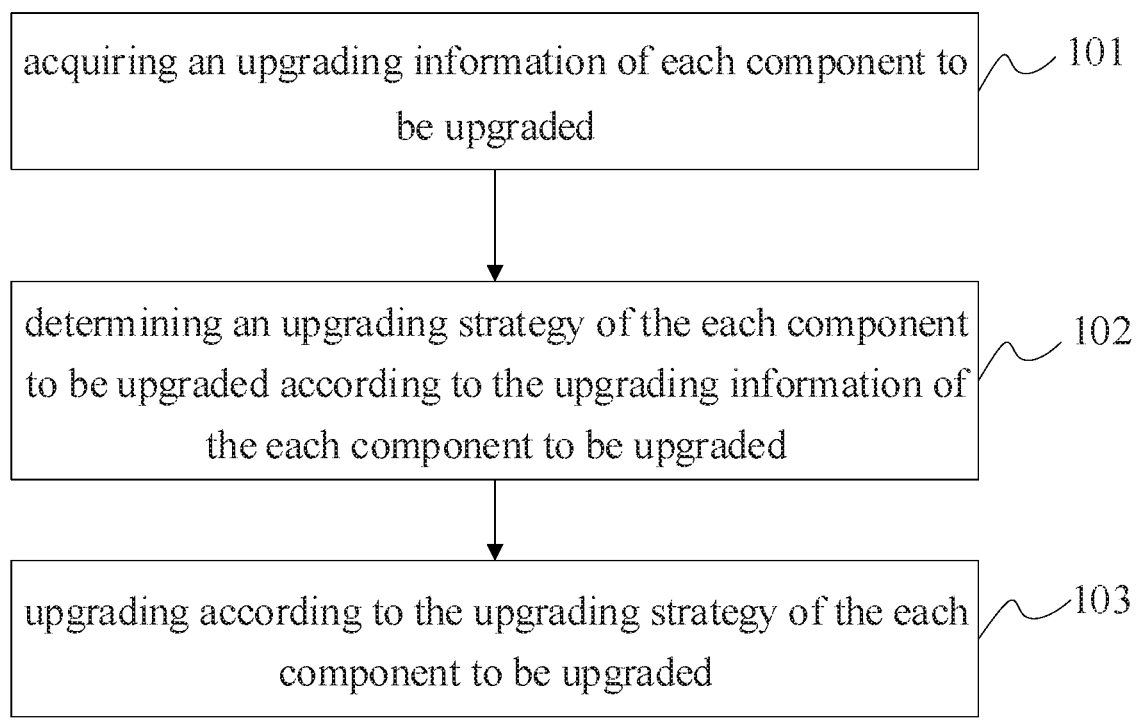
FIG. 1 is a schematic flowchart of an upgrading method provided in embodiments of the present disclosure.

With respect to the above scenarios, as shown FIG. 1, embodiments of the present disclosure provide an upgrading method including, step 101, acquiring an upgrading information of each component to be upgraded;

step 102, determining an upgrading strategy of the each component to be upgraded according to the upgrading information of the each component to be upgraded;

step 103, upgrading according to the upgrading strategy of the each component to be upgraded.

In step 101, the each component to be upgraded may correspond to the same application or may be of multiple applications. For example, the each component to be upgraded may be a component A to be upgraded, a component B to be upgraded, a component C to be upgraded, a component D to be upgraded and a component E to be upgraded. Herein, the component A to be upgraded and the component B to be upgraded are components to be upgraded of an application A, while the component C to be upgraded, the component D to be upgraded and the component E to be upgraded are components to be upgraded of an application B.

In embodiments of the present disclosure, the upgrading information of the each component to be upgraded includes component identification information, component version information and the like. It may be determined how to upgrade the components to be upgraded by acquiring the upgrading information of the each component to be upgraded.

For example, in embodiments of the present disclosure, the upgrading information of the each component to be upgraded may be acquired through user input. For example, in embodiments of the present disclosure, a visual interface is provided. As shown in FIG. 2, a user may input a first component to be upgraded, upgrading information of the first component to be upgraded, a second component to be upgraded and upgrading information of the second component to be upgraded on the interface. In FIG. 2, the upgrading information at least includes an upgrading version number, an upgrading server and the like. The upgrading information of the component to be upgraded may be determined by ticking the selected.

In step 102, an upgrading strategy of the each component to be upgraded may be determined after the upgrading information of the each component to be upgraded is acquired.

Specifically, if a relationship between the each component to be upgraded may be determined according to such information as component identification information and component version information of the each component to be upgraded, for example, if the component A to be upgraded and the component B to be upgraded are components to be upgraded of the application A, component identification information of the component A to be upgraded is 1 and component identification information of the component B to be upgraded is 2, it may be deemed that there is a dependent relationship between the component A to be upgraded and the component B to be upgraded. That is, upgrading of the component B to be upgraded may not be performed until upgrading of the component A to be upgraded is completed. Therefore, in embodiments of the present disclosure, if it is determined that there is a dependent relationship between upgrading of the second component to be upgraded and upgrading of the first component to be upgraded, it is determined that an upgrading strategy of the second component to be upgraded is to be jointly upgraded with the first component to be upgraded.

It may be understood that joint upgrading means acquiring an upgrading result of the first component to be upgraded after the first component to be upgraded is upgraded; and upgrading the second component to be upgraded according to the upgrading result of the first component to be upgraded and upgrading information of the second component to be upgraded.

For example, in embodiments of the present disclosure, a difference in an upgrading result of the first component to be upgraded will lead to a difference in an upgrading process of the second component to be upgraded. The upgrading process of the second component to be upgraded may be adjusted through the upgrading result of the first component to be upgraded, so that upgrading of the entire application may be performed.

Exemplarily, if an upgrading result of the first component to be upgraded is A, it is determined that the upgrading process of the second component to be upgraded is an "a" process according to the upgrading result A and the upgrading information of the second component to be upgraded. If an upgrading result of the first component to be upgraded is A', it is determined that the upgrading process of the second component to be upgraded is an "a'" process according to the upgrading result A' and the upgrading information of the second component to be upgraded.

For example, in embodiments of the present disclosure, apart from a joint upgrading strategy, there is further a single upgrading strategy. That is to say, if it is determined that there is no dependent relationship between the upgrading of the second component to be upgraded and the upgrading of the first component to be upgraded, the first component to be upgraded and the second component to be upgraded may be upgraded separately.

In one example, in order to improve an upgrading efficiency, the first component to be upgraded and the second component to be upgraded may be upgraded in parallel.

In another example, if the first component to be upgraded, the second component to be upgraded and other components to be upgraded may be jointly upgraded, and if there is no dependent relationship between a third component to be upgraded and a collection of components to be upgraded composed by the first component to be upgraded, the second component to be upgraded and the other components to be upgraded, in order to improve an upgrading efficiency, the collection of components to be upgraded and the third component to be upgraded may be upgraded in parallel.

For example, in order to synchronously complete upgrading the third component to be upgraded and the collection of components to be upgraded, a component to be upgraded that has the same upgrading granularity as the collection of components to be upgraded and that has no dependent relationship with other components to be upgraded may be taken as the third component to be upgraded, as the third component to be upgraded will be parallel upgraded with the collection of components to be upgraded.

In embodiments of the present disclosure, the upgrading granularity refers to a minimum value of data amount during upgrading. It is supposed that a granularity of the first component to be upgraded is M, a granularity of the second component to be upgraded is N, a granularity of the third component to be upgraded is P, and M+N=P. Accordingly, the third component to be upgraded is being upgraded while the first component to be upgraded starts being upgraded, and upgrading of the third component to be upgraded is completed when the upgrading of the second component to be upgraded is completed.

For example, in embodiments of the present disclosure, the acquired upgrading information of the each component to be upgraded further includes upgrading batches which refer to an upgrading order of servers corresponding to the each component to be upgraded. Since each component corresponds to multiple servers which may be distributed in different computer rooms, the upgrading batches refer to sequencing the servers in the different computer rooms to determine the upgrading order. After the upgrading order is determined, the upgrading is performed according to the determined upgrading order.

Exemplarily, one component to be upgraded corresponds to N servers distributed in four computer rooms, a computer room 1, a computer room 2, a computer room 3 and a computer room 4, and the upgrading batches are the computer room 4, the computer room 3, the computer room 1 and the computer room 2. Accordingly, based on the upgrading batches, all servers in the computer room 4 are upgraded first, then all servers in the computer room 3 are upgraded, all servers in the computer room 2 are upgraded and finally, all servers in the computer room 1 are upgraded.

For example, in embodiments of the present disclosure, the upgrading order of the servers may be determined by a deployment computer room and a deployment environment corresponding to the component to be upgraded. The deployment environment may be that the server is used to perform a test or is to be launched to be used after the test is completed.

That is to say, in embodiments of the present disclosure, the upgrading batches of the components to be upgraded shall be taken into account when determining the upgrading strategy of the each component to be upgraded.

In embodiments of the present disclosure, in order to ensure normal use of an application, traffic switching and traffic mounting between servers are performed during upgrading. The traffic switching refers to, during the upgrading, some servers of the second component to be upgraded need to be upgraded, and a traffic sent to the servers demanding upgrading needs to be guided to other servers that are not upgraded yet or that are upgraded already. The traffic mounting refers to processing the guided traffic on the other servers that are not upgraded yet or that are upgraded already, that is, to mount a catalog that processes the traffic on one original server to a catalog of the other server, to process the traffic.

Exemplarily, the second component to be upgraded corresponds to four servers. When upgrading a first server, traffic information that shall be processed by the first server is guided to a second server, a third server and a fourth server. After upgrading of the first server is completed, the traffic is switched, that is, a traffic that has not been completed processing by the second, third and fourth servers is further processed by the first server.

For example, in embodiments of the present disclosure, in order to ensure correctness of an upgrading result, an upgrading result of each server corresponding to a current batch of component to be upgraded is verified before upgrading the each server corresponding to a next batch of component to be upgraded. If it is determined that the upgrading result of the each server corresponding to the current batch of component to be upgraded is validated, each server corresponding to the next batch of component to be upgraded is upgraded. It may be deemed that if the verification is fails, the next batch of component to be upgraded shall not be upgraded.

In step 103, after upgrading according to an upgrading strategy of the each component to be upgraded, the upgrading strategy is saved. If it is necessary to perform a rollback operation, for example, if the rollback operation is necessary when a running error occurs to an application or to an upgrading terminal of the application, a re-upgrading operation is performed according to a saved upgrading strategy.

Exemplarily, the application is a latest version, an error occurs when the latest version is applied, and the application rolls back to a previous version. The saved upgrading strategy of the application is a first batch of the component A to be upgraded, a second batch of the component A to be upgraded and the component B to be upgraded. Meanwhile, the component C to be upgraded and the component A to be upgraded are upgraded synchronously. Upgrading is performed according to the upgrading strategy when the application rolls back to the previous version.

Figure 3:
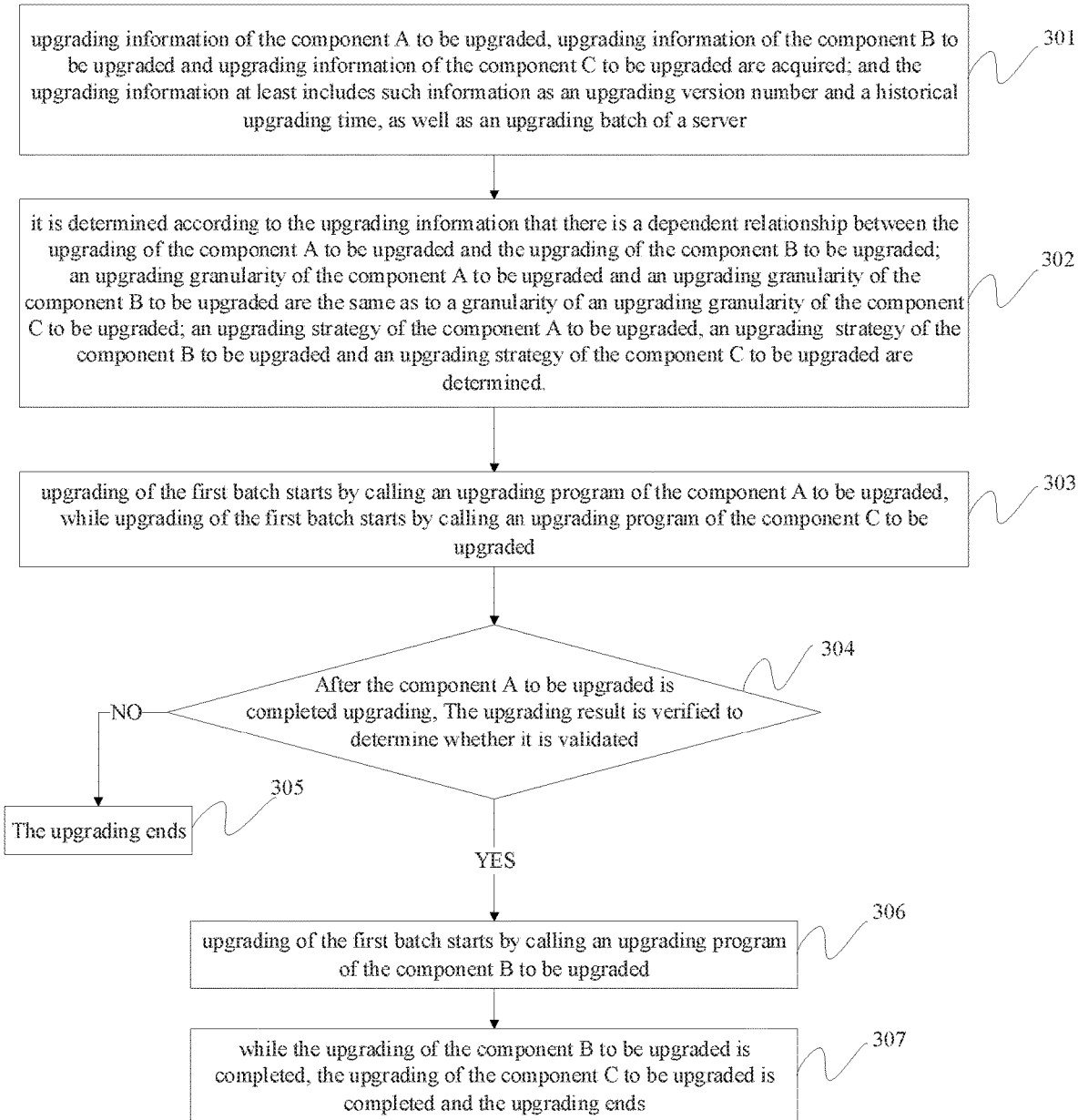
FIG. 3 is a schematic flowchart of an upgrading method provided in embodiments of the present disclosure.

Embodiments will be used for description in the following. In embodiments of the present disclosure, as shown in FIG. 3, it is provided an upgrading method. When performing upgrading, for one application software, there is three components, the component A to be upgraded, the component B to be upgraded and the component C to be upgraded, need to be upgraded. A specific process of the upgrading is as follows.

In step 301, upgrading information of the component A to be upgraded, upgrading information of the component B to be upgraded and upgrading information of the component C to be upgraded are acquired; and the upgrading information at least includes such information as an upgrading version number and a historical upgrading time, as well as an upgrading batch of a server.

In step 302, it is determined according to the upgrading information that there is a dependent relationship between the upgrading of the component A to be upgraded and the upgrading of the component B to be upgraded. An upgrading granularity of the component A to be upgraded and an upgrading granularity of the component B to be upgraded are the same as to a granularity of an upgrading granularity of the component C to be upgraded. It is determined that an upgrading strategy of the component A to be upgraded is "a first batch of upgrading a greyscale server", that is, only some servers in the component A to be upgraded is upgraded and tested. When it is ensured that there is no error to a program, all servers corresponding to the component A to be upgraded are upgraded, "a second batch of upgrading an environment server", and "a third batch of upgrading other environment server". It is determined that an upgrading strategy of the component B to be upgraded is to be upgraded after the component A to be upgraded is completed upgrading, and an upgrading batch order is "the first batch of upgrading a greyscale server" and "the second batch of upgrading an environment server". It is determined that an upgrading strategy of the component C to be upgraded is to be upgraded synchronously with the upgrading of the component A to be upgraded, and a batch order of the upgrading is "the first batch of upgrading a greyscale server", "the second batch of upgrading an environment server", "the third batch of upgrading other environment server" and "a fourth batch of upgrading other environment server".

In step 303, upgrading of the first batch starts by calling an upgrading program of the component A to be upgraded, while upgrading of the first batch starts by calling an upgrading program of the component C to be upgraded.

In step 304, after the component A to be upgraded is completed upgrading, the upgrading result is verified. If the verify is validated, a step 306 is implemented; otherwise, a step 305 is implemented.

In step 305, the upgrading ends.

In step 306, upgrading of the first batch starts by calling an upgrading program of the component B to be upgraded.

In step 307, while the upgrading of the component B to be upgraded is completed, the upgrading of the component C to be upgraded is completed and the upgrading ends.

Figure 4:
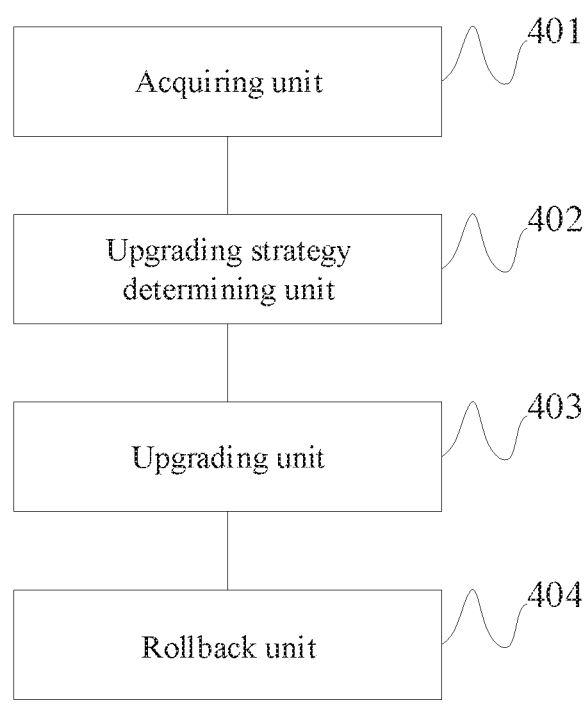
FIG. 4 is a schematic structure of an upgrading apparatus provided in embodiments of the present disclosure.

Based on the same inventive concept, as shown in FIG. 4, embodiments of the present disclosure further provides an upgrading apparatus including, an acquiring unit 401, configured to acquire upgrading information of each component to be upgraded;

an upgrading strategy determining unit 402, configured to determine an upgrading strategy of the each component to be upgraded according to the upgrading information of the each component to be upgraded;

an upgrading unit 403, configured to perform upgrading according to the upgrading strategy of the each component to be upgraded.

For example, the upgrading strategy determining unit 402 is specifically configured to, determine, if it is determined that upgrading of a second component to be upgraded is in a dependent relationship with upgrading of a first component to be upgraded, that an upgrading strategy of the second component to be upgraded is to be upgraded jointly with the first component to be upgraded.

For example, the upgrading unit 403 is specifically configured to, acquire an upgrading result of the first component to be upgraded after the first component to be upgraded is upgraded; and upgrade the second component to be upgraded according to the upgrading result of the first component to be upgraded and upgrading information of the second component to be upgraded.

For example, the upgrading strategy determining unit 402 is specifically configured to, parallel upgrade, if it is determined that there is no dependent relationship between a third component to be upgraded and another component to be upgraded according to upgrading information of the third component to be upgraded and that an upgrading granularity of the third component to be upgraded is the same as an upgrading granularity of a component collection to be upgraded composed by each component to be upgraded that involve a dependent relationship, the third component to be upgraded and the component collection to be upgraded.

For example, the upgrading information of the each component to be upgraded includes upgrading batches; and the upgrading unit 403 is specifically configured to, determine an upgrading batch of each server corresponding to the component to be upgraded; and upgrade the each server corresponding to each component to be upgraded in turn of the upgrading batches.

For example, the upgrading strategy further includes, a traffic switching time and/or a traffic mounting time between servers corresponding to the each component to be upgraded; and the upgrading unit 403 is specifically configured to, upgrade the each server corresponding to the each component to be upgraded in turn of the upgrading batches, and perform traffic switching and/or traffic mounting on each server according to the traffic switching time and/or the traffic mounting time between servers corresponding to the each component to be upgraded.

For example, the upgrading unit 403 is specifically configured to, verify an upgrading result of the each server corresponding to a current batch of component to be upgraded before upgrading the each server corresponding to a next batch of component to be upgraded; and upgrade the each server corresponding to the next batch of component to be upgraded, if it is determined that the upgrading result of the each server corresponding to the current batch of component to be upgraded is validated.

For example, the apparatus further includes, a rollback unit 404, configured to save an upgrading strategy of the each component to be upgraded, and to perform a re-upgrading operation according to the upgrading strategy when it is determined that rollback operation needs to be performed.

Figure 5:
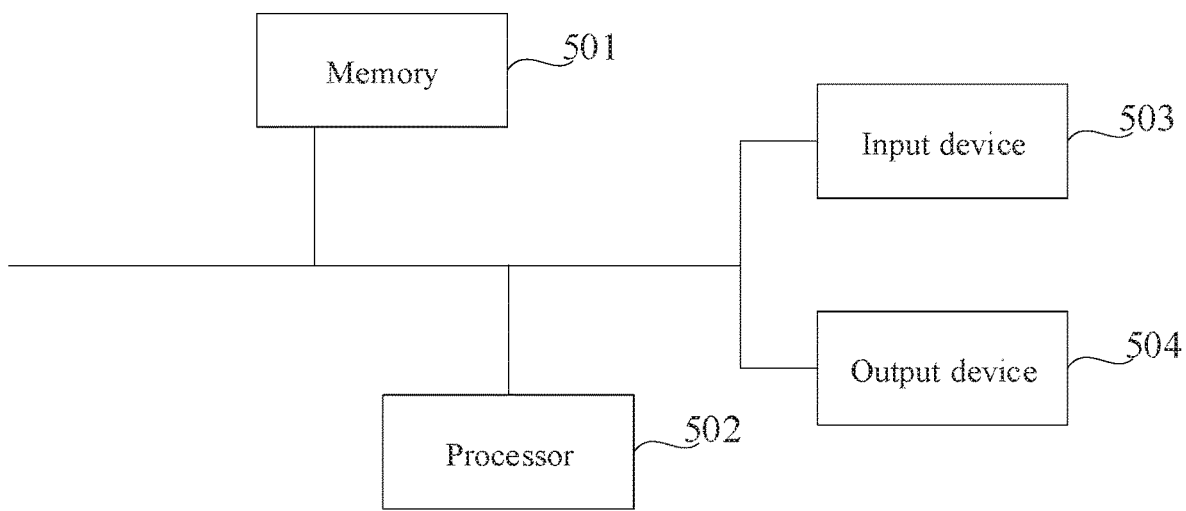
FIG. 5 is a schematic structure of an electronic device provided in embodiments of the present disclosure.

Embodiments of the present disclosure provides an electronic device including at least one processing unit and at least one storage unit, and the storage unit stores a computer program, so that the processing unit implements steps of an upgrading method when the program is executed by the processing unit. FIG. 5 shows a schematic structure of hardware of the electronic device as described in embodiments of the present disclosure. The electronic device may specifically be a desktop computer, a portable computer, a smart phone, a tablet and so on. Specifically, the electronic device may include a memory 501, a processor 502 and a computer program stored in the memory, and the processor 502 implements steps of any upgrading method in the above-described embodiments when executing the program. Herein, the memory 501 may include a read-only memory (ROM) and a random access memory (RAM), and provides program instructions and data saved in the memory 501 to the processor 502.

For example, the electronic device described in embodiments of the present disclosure may further include an input device 503, an output device 504 and the like. The input device 503 may include a keyboard, a mouse, a touch screen and so on. The output device 504 may include a display device such as a liquid crystal display, a cathode ray tube (CRT), a touch screen, and the like. The memory 501, the processor 502, the input device 503 and the output device 504 may be connected by a bus or other means, as exemplified by a bus connection in FIG. 5. The processor 502 calls the program instructions stored in the memory 501 and executes the upgrading method provided in the above embodiments according to the program instructions obtained.

Embodiments of the present disclosure provide a computer-readable medium, storing a computer program executable by a terminal device, so that the terminal device implements any one of the above upgrading methods when the program runs on the terminal device.

The present disclosure is described with reference to flowcharts and/or block diagrams of methods, apparatuses (systems), and computer program products according to embodiments of the present disclosure. It shall be understood that each flow and/or block of the flowcharts and/or block diagram and combinations of a flow and/or a block of the flowcharts and/or block diagram may be realized by the computer program instructions. These computer program instructions may be provided to a processor of a general-purpose computer, a special-purpose computer, an embedded processor, or another programmable data processing device to produce a machine to generate a device for implementing functions specified in one or more steps in the flowcharts and/or one or more blocks in the block diagrams by instructions executed by a computer or a processor of another programmable data processing device.

These computer program instructions may further be stored in a computer-readable memory that may direct a computer or another programmable data processing device to operate in a particular manner, such that instructions stored in the computer-readable memory produce an article of manufacture that includes an instruction device. The instruction device implements functions specified in one or more steps of the flowcharts and/or one or more blocks of the block diagrams.

These computer program instructions may further be loaded into a computer or another programmable data processing device such that a series of operational steps are implemented in the computer or the other programmable device to produce computer-implemented processing, such that the instructions that are executed in the computer or the other programmable device are used for implementing the steps of the functions specified in the one or more steps of the flowcharts or in the one or more blocks of the block diagrams.

Although the embodiments of the present disclosure have been described, those skilled in the art may make additional changes and modifications to the embodiments once they are aware of the basic inventive concept of the present disclosure. Therefore, the appended claims are intended to be interpreted as including the embodiments and all changes and modifications that fall into the scope of the present disclosure.

It is evident to those skilled in the art that various modifications and variants may be made in the present disclosure without departing from the spirit and scope of the disclosure. Thus, if the modifications and variants of the present disclosure fall into the claims of the present disclosure and their equivalent technologies, the present disclosure is also intended to include these modifications and variations.

What is claimed is:

1. An upgrading method, comprising,
acquiring upgrading information of each component to be upgraded;
determining an upgrading strategy of the each component to be upgraded according to the upgrading information of the each component to be upgraded;
upgrading according to the upgrading strategy of the each component to be upgraded;
wherein determining the upgrading strategy of the each component to be upgraded according to the upgrading information of the each component to be upgraded comprises:
determining, if it is determined that upgrading of a second component to be upgraded is in a dependent relationship with upgrading of a first component to be upgraded, that an upgrading strategy of the second component to be upgraded is upgraded jointly with the first component to be upgraded; and
parallel upgrading, if it is determined that there is no dependent relationship between a third component to be upgraded and other components to be upgraded according to upgrading information of the third component to be upgraded and that an upgrading granularity of the third component to be upgraded is the same as an upgrading granularity of a component collection to be upgraded composed of components to be updated that have a dependent relationship, the third component to be upgraded and the component collection to be upgraded.

2. The method according to claim 1, wherein upgrading according to the upgrading strategy for the each component to be upgraded comprises,
acquiring an upgrading result of the first component to be upgraded after the first component to be upgraded is upgraded; and
upgrading the second component to be upgraded according to the upgrading result of the first component to be upgraded and upgrading information of the second component to be upgraded.

3. The method according to 1, wherein the upgrading information of the each component to be upgraded comprises upgrading batches; and
wherein upgrading according to the upgrading strategy of the each component to be upgraded comprises,
determining an upgrading batch of each server corresponding to the component to be upgraded;
upgrading each server corresponding to the each component to be upgraded in turn of the upgrading batches.

4. The method according to claim 3, wherein the upgrading strategy further comprises,
a traffic switching time and/or a traffic mounting time between servers corresponding to the each component to be upgraded; and
wherein upgrading each server corresponding to the each component to be upgraded in turn of the upgrading batches comprises,
upgrading the each server corresponding to the each component to be upgraded in turn of the upgrading batches, and performing traffic switching and/or traffic mounting on each server according to the traffic switching time and/or the traffic mounting time between servers corresponding to the each component to be upgraded.

5. The method according to claim 3, wherein upgrading each server corresponding to the each component to be upgraded in turn of the upgrading batches comprises,
verifying an upgrading result of each server corresponding to a current batch of component to be upgraded before upgrading each server corresponding to a next batch of component to be upgraded; and
upgrading, each server corresponding to the next batch of component to be upgraded, if it is determined that the upgrading result of the each server corresponding to the component to be upgraded of the current batch is validated.

6. The method according to claim 3, after upgrading according to the upgrading strategy of the each component to be upgraded, further comprising, saving the upgrading strategy of the each component to be upgraded, and re-upgrading according to the upgrading strategy when determining to perform a rollback operation.

7. The method according to claim 3, further comprises,
determining, an upgrading order of servers, by a deployment computer room and a deployment environment corresponding to the component to be upgraded; and
the deployment environment is that the server is used to perform a test or is to be launched to be used after the test is completed.

8. The method according to claim 1, wherein the upgrading information of the each component to be upgraded comprises component identification information and component version information; and the method further comprises,
determining how to upgrade the components to be upgraded by acquiring the upgrading information of the each component to be upgraded.

9. An electronic device, comprising at least one processing unit and at least one storage unit, wherein the storage unit stores a computer program, so that the processing unit implements steps of an upgrading method when the program is executed by the processing unit;
wherein the upgrading method comprises:
acquiring upgrading information of each component to be upgraded;
determining an upgrading strategy of the each component to be upgraded according to the upgrading information of the each component to be upgraded; and
upgrading according to the upgrading strategy of the each component to be upgraded;
wherein determining the upgrading strategy of the each component to be upgraded according to the upgrading information of the each component to be upgraded comprises:
determining, if it is determined that upgrading of a second component to be upgraded is in a dependent relationship with upgrading of a first component to be upgraded, that an upgrading strategy of the second component to be upgraded is upgraded jointly with the first component to be upgraded; and parallel upgrading, if it is determined that there is no dependent relationship between a third component to be upgraded and other components to be upgraded according to upgrading information of the third component to be upgraded and that an upgrading granularity of the third component to be upgraded is the same as an upgrading granularity of a component collection to be upgraded composed of components to be updated that have a dependent relationship, the third component to be upgraded and the component collection to be upgraded.

10. The electronic device according to claim 9, wherein upgrading according to the upgrading strategy for the each component to be upgraded comprises,
acquiring an upgrading result of the first component to be upgraded after the first component to be upgraded is upgraded; and
upgrading the second component to be upgraded according to the upgrading result of the first component to be upgraded and upgrading information of the second component to be upgraded.

11. The electronic device according to claim 9, wherein the upgrading information of the each component to be upgraded comprises upgrading batches; and
wherein upgrading according to the upgrading strategy of the each component to be upgraded comprises,
determining an upgrading batch of each server corresponding to the component to be upgraded;
upgrading each server corresponding to the each component to be upgraded in turn of the upgrading batches.

12. The electronic device according to claim 11, wherein the upgrading strategy further comprises,
a traffic switching time and/or a traffic mounting time between servers corresponding to the each component to be upgraded; and
wherein upgrading each server corresponding to the each component to be upgraded in turn of the upgrading batches comprises,
upgrading the each server corresponding to the each component to be upgraded in turn of the upgrading batches, and performing traffic switching and/or traffic mounting on each server according to the traffic switching time and/or the traffic mounting time between servers corresponding to the each component to be upgraded.

13. The electronic device according to claim 11, wherein upgrading each server corresponding to the each component to be upgraded in turn of the upgrading batches comprises,
verifying an upgrading result of each server corresponding to a current batch of component to be upgraded before upgrading each server corresponding to a next batch of component to be upgraded; and
upgrading, each server corresponding to the next batch of component to be upgraded, if it is determined that the upgrading result of the each server corresponding to the component to be upgraded of the current batch is validated.

14. The electronic device according to claim 11, after upgrading according to the upgrading strategy of the each component to be upgraded, further comprising, saving the upgrading strategy of the each component to be upgraded, and re-upgrading according to the upgrading strategy when determining to perform a rollback operation.

15. A non-transitory computer readable medium, storing a computer program executable by a terminal device, so that the terminal device implements steps of an upgrading method when the program runs on the terminal device;
wherein the upgrading method comprises:
acquiring upgrading information of each component to be upgraded;
determining an upgrading strategy of the each component to be upgraded according to the upgrading information of the each component to be upgraded; and
upgrading according to the upgrading strategy of the each component to be upgraded;
wherein determining the upgrading strategy of the each component to be upgraded according to the upgrading information of the each component to be upgraded comprises:
determining, if it is determined that upgrading of a second component to be upgraded is in a dependent relationship with upgrading of a first component to be upgraded, that an upgrading strategy of the second component to be upgraded is upgraded jointly with the first component to be upgraded; and
parallel upgrading, if it is determined that there is no dependent relationship between a third component to be upgraded and other components to be upgraded according to upgrading information of the third component to be upgraded and that an upgrading granularity of the third component to be upgraded is the same as an upgrading granularity of a component collection to be upgraded composed of components to be updated that have a dependent relationship, the third component to be upgraded and the component collection to be upgraded.

* * * * *